United States Patent [19]
Anthamatten

[11] 3,870,134
[45] Mar. 11, 1975

[54] BRAKE AND MULTI-SPEED DRIVE FOR A BICYCLE

[76] Inventor: Joseph L. Anthamatten, Precious Blood Seminary, Ruth Ewing Rd., Liberty, Mo. 64068

[22] Filed: May 13, 1974

[21] Appl. No.: 469,238

[52] U.S. Cl. .................................. 192/6 A, 192/64
[51] Int. Cl. ............................................. F16d 67/02
[58] Field of Search ............................ 192/6 A, 6 R

[56] References Cited
UNITED STATES PATENTS

| | | | |
|---|---|---|---|
| 2,489,934 | 11/1949 | Schwinn | 192/64 |
| 2,565,819 | 8/1951 | Hooykaas | 192/6 R |
| 3,506,100 | 4/1970 | Tomozawa | 192/6 A |
| 3,650,363 | 3/1972 | Cristie | 192/6 A |

Primary Examiner—Benjamin W. Wyche
Attorney, Agent, or Firm—Fishburn, Gold & Litman

[57] ABSTRACT

A multi-speed bicycle drive and coaster brake arrangement having a brake in a wheel hub and an actuator separate from the forward drive member. A pedal crank and sprocket arrangement is rotatably mounted on the bicycle frame with a brake sprocket on one side and drive sprockets on the other side of the frame with a brake chain engaged with brake sprocket and a drive chain engaged with drive sprockets. A multi-stage drive sprocket and forward driving clutch are mounted on the hub of the rear wheel and engaged by the drive chain for driving the rear wheel. A brake sprocket is mounted on the axle of the rear hub on the opposite side of the rear multi-stage drive sprocket and is engaged by the brake chain whereby minimal reverse rotation of the pedal crank effects actuation of the coaster brake.

6 Claims, 5 Drawing Figures

3,870,134

BRAKE AND MULTI-SPEED DRIVE FOR A BICYCLE

The principal objects of the present invention are: to provide a multi-speed bicycle with a coaster brake that has a plurality of braking members between an axle and a wheel hub that is disengaged when an acutator is stationary or rotated in a forward direction and engaged by reverse rotation of said actuator and that is safe and easy to use; to provide such a coaster brake which is actuated by reverse rotation of the pedal crank and requires a minimum of rotation to actuate the coaster brake; to provide such a coaster brake which is compact and requires a minimum of space for mounting on the bicycle frame; to provide such a coaster brake which is simple in construction and has a minimum of parts; to provide the multi-speed bicycle with a multi-speed drive arrangement with a forward driving clutch between the forward drive sprockets and the hub of the rear wheel which is engaged when the forward drive sprockets are rotated for forward movement of the bicycle; to provide such a driving arrangement with a clutch which requires a minimum of forward rotation for actuation of same; to provide such a coaster brake and driving arrangement having a separate brake actuating chain and driving chain each positioned on opposite sides of the rear wheel; to provide such a coaster brake and drive arrangement that eliminates entanglement of the brake chain and drive chain; to provide such a coaster brake and drive arrangement that is easily worked on and repaired and requiring a minimum of disassembly for repair; and to provide such a coaster brake and drive arrangement that is well adapted for its intended use.

Other objects and advantages of the present invention will become apparent from the following detailed description taken in connection with the accompanying drawings wherein are set forth by way of illustration and example certain embodiments of this invention.

Figure 1:
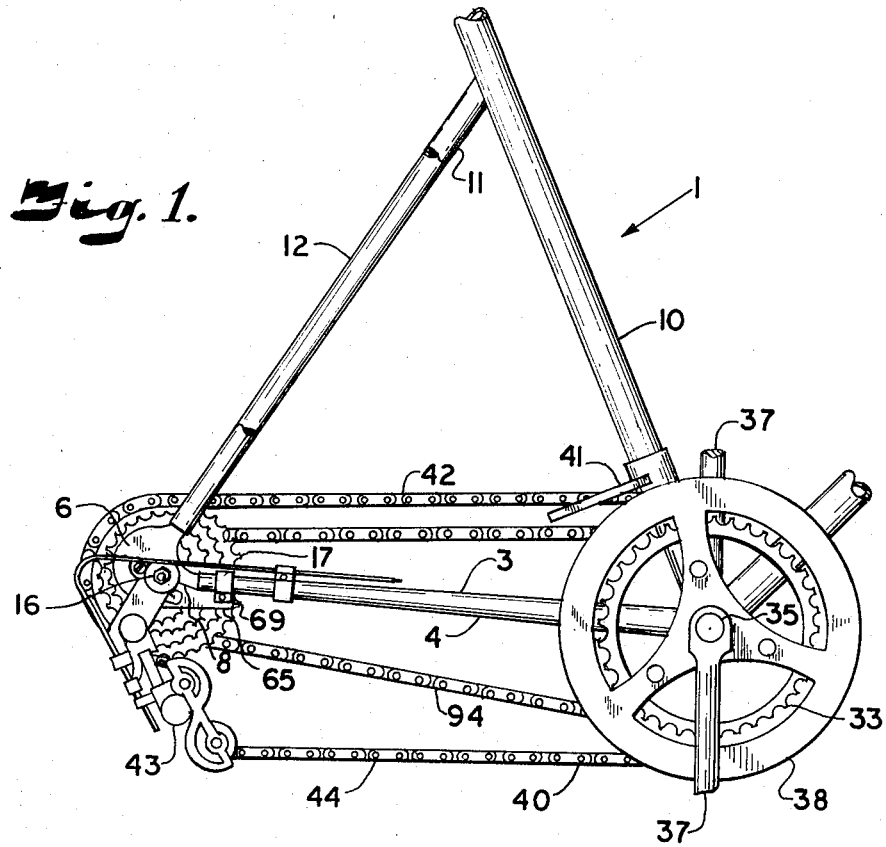
FIG. 1 is an elevational view of a portion of a bicycle showing a multi-speed drive arrangement and coaster brake arrangement.
Figure 2:
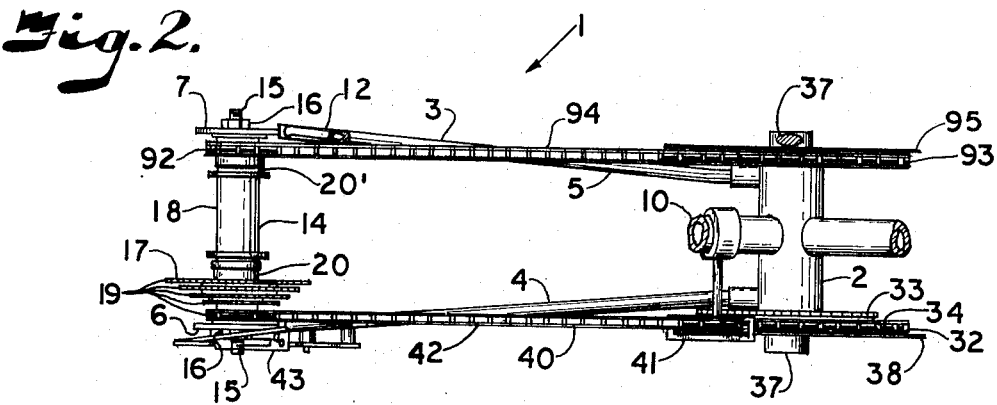
FIG. 2 is a plan view of the multi-speed drive assembly and coaster brake arrangement.
Figure 3:
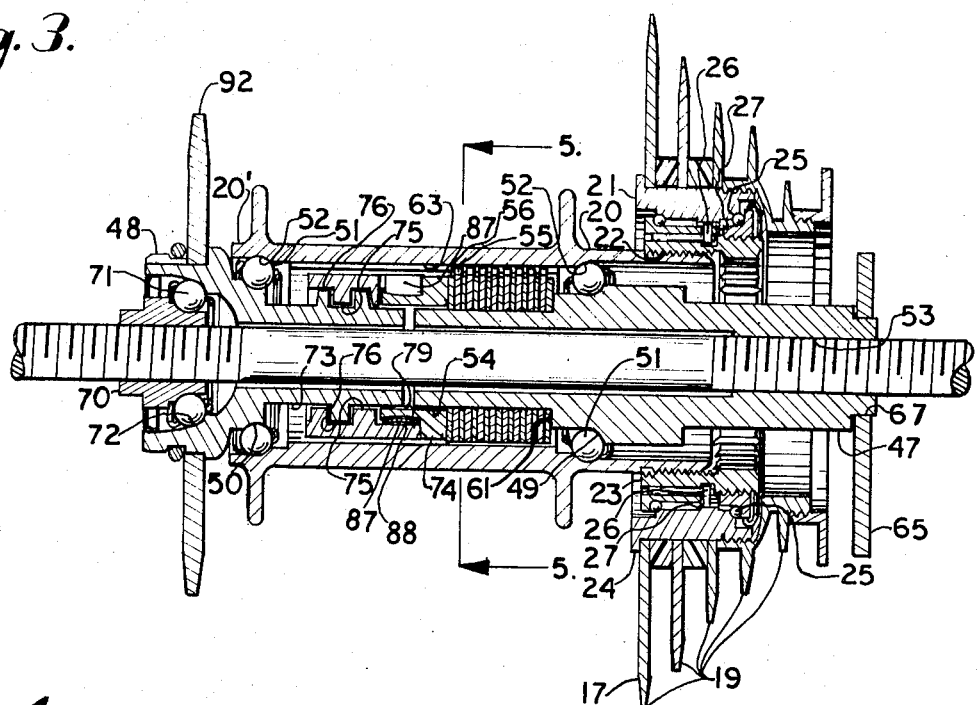
FIG. 3 is a section view of the hub of the rear wheel showing details of the coaster brake and multi-stage drive sprocket and clutch.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a bicycle frame which may be of generally conventional form and includes a drive sprocket mounting member 2 and an elongate substantially horizontal U-shaped member 3 extending rearwardly therefrom. The U-shaped member 3 has two laterally spaced arms or members 4 and 5 with flat portions 6 and 7 respectively in spaced parallel planes on the free ends thereof for suitably mounting a rear axle assembly. In the illustrated structure, the flat portion 6 has a elongate substantially horizontal slot 8 and the flat portion 7 has a similar slot (not shown) opening forward. A bicycle member 10 is secured to the sprocket mounting member 2 and extends generally upwardly therefrom at an acute angle to the U-shaped member 3. Bicycle frame members 11 and 12 are each secured to the flat portions 6 and 7 respectively and extend generally upwardly therefrom disposed at an acute angle to the U-shaped member 3. The frame members 11 and 12 have upper ends secured to the upper end of the frame member 10 thereby forming a rigid triangular shaped rear bicycle frame portion.

A rear hub assembly 14 is rotatably mounted on a rear axle or shaft 15 which is secured in the elongate slots 8 by suitable fasteners 16, such as hex nuts, and extends between the flat portions 6 and 7. A multi-stage sprocket assembly 17 is operably connected to a wheel hub 18 having opposite ends 20 and 20' in such a manner that forward rotation of the sprocket assembly 17 will effect forward rotation of the wheel hub 18, and reverse rotation will allow the hub 18 to free wheel in the foward rotation direction. As illustrated, the sprocket assembly 17 is mounted on the hub 18 at the end 20 and has a plurality of spockets 19, as for example, five in number with each having a different diameter. Preferably, the outermost disposed sprocket is the smallest with each inner sprocket from the smallest sprocket being successively larger than the immediately adjacent outer sprocket.

In the illustrated structure, a clutch 21 operatively connects the sprocket assembly 17 to the hub 18 to selectively permit driving of the hub 18 in the forward direction by rotation of the sprocket wheel assembly 17 in the forward direction. The clutch preferably is of a type which requires a minimum of relative rotational displacement in the forward direction between the sprocket assembly 17 and the hub 18 to effect driving thereof. As shown, the clutch 21 is suitably mounted on the hub 18 on the exterior thereof, such as by threaded engagement therewith as at 22 and has the sprocket 19 mounted thereon. The clutch 21 preferably is of a ratchet type requiring a minimum of rotational or angular displacement for actuation. The clutch 21 includes an inner cage 23 secured to the hub 18 with an outer cage 24 rotatable thereon, such as by having ball bearings 25 therebetween. The sprockets 19 are secured to the outer cage 24. The interior surface of the outer cage 24 has a plurality of circumferentially spaced teeth 26 thereon and the inner cage 23 has a pair of spring loaded pawls 27 pivotally mounted thereon in diametrically opposed relation and selectively interengageable with the teeth 26. Forward rotation of the sprocket wheels 19 and outer cage 24 relative to the inner cage 23 effects engagement between the pawls 27 and teeth 26 so that the spocket wheels 19 drives the hub 18. Reverse rotation of the sprocket wheels 19 relative to the inner cage 23 allows the hub 18 to free wheel in the forward direction.

A drive sprocket assembly 32 is rotatably mounted on the frame 1 and includes a plurality of drive sprockets 33 and 34, preferably two in number, secured to a sprocket shaft 35 and rotatably supported in suitable bearings in the mounting number 2. Pedal cranks 37 are secured to the shaft 35 with one said pedal crank being secured to one end of the shaft which extends through the mounting member 2 on the side of the mounting member 2 opposite the drive sprockets 33 and 34. The other pedal crank 37 is secured to the shaft 35 and is outwardly disposed of the outer sprocket 34. The front drive sprocket assembly 32 may be a conventional form for multi-speed bicycles. The sprockets 33 and 34 are of different diameters with the largest sprocket 34 preferably being disposed outermost of the frame and the smaller sprocket 33 being disposed between the sprocket 34 and the frame 1. A chain guard 38 is mounted on the outermost sprocket 34 and extends radially outwardly of same preventing objects such as an operator's pant leg from becoming entangled with a drive chain 40 and the sprockets 33 and 34.

The sprocket assembly 32 is operatively connected to the multi-stage sprocket 17 by a drive chain 40 that engages a selected rear sprocket 19 and one of the drive sprockets 33 and 34 whereby rotation of the sprocket assembly 32 effects rotation of the multi-stage sprocket 17 and hub 18 in the same direction.

A shifting lever 41 is mounted on the frame member 10 adjacent to the sprockets 33 and 34 and engages the upper run 42 of the drive chain 40. The shifting lever 41 selectively changes or shifts the drive chain 40 from one of the drive sprockets 33 and 34 to the other of the drive sprockets 33 and 34, as in a conventional multi-speed bicycle structure, thereby changing the speed ratio of the bicycle. A rear shifting mechanism 43 is mounted on the flat portion 6 and is positioned adjacent to the rear hub assembly 14. The shifting mechanism 43 is in engagement with a lower run 44 of the drive chain and maintains tension therein during forward rotation of the multi-stage sprocket 17 and sprocket assembly 32 and is operable to selectively change or shift the drive chain 40 from one of the sprockets 19 to an adjacent sprocket 19, as in a conventional multi-speed bicycle structure, thereby changing the speed ratio of the bicycle.

The rear hub assembly 14 includes a brake assembly which is operable to selectively brake the hub 18 and the bicycle rear wheel. In the form shown, the brake assembly is of a coaster brake type and includes a brake disc holder shaft 47 and a brake actuating shaft 48 both suitably mounted on the axle 18 and having bearing races 49 and 50 respectively with ball bearings 51 engaging same and bearing races 52 in the interior of the hub 18 whereby the hub 18 is rotatable about the axle 15.

Figure 4:
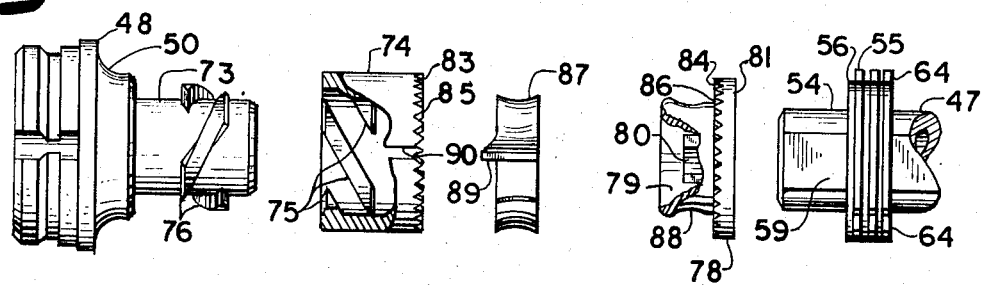
FIG. 4 is an enlarged elevational view of portions of the coaster brake with portions broken away to show structural details, thereof.
Figure 5:
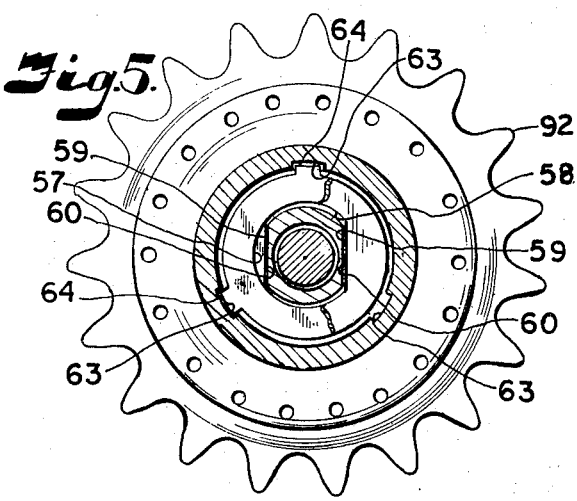
FIG. 5 is a transverse section view of the rear hub taken along the line 5—5, FIG. 3.

The brake holder shaft 47 is threaded onto the axle 15 as at 53 and has a shank portion 54 extending into the interior of the hub 18. Brake discs 55 and 56 have openings 57 and 58 respectively, therethrough and mounted on the shank 54 with same extending through the openings 57 and 58. The brake discs 55 are rotatable on the shank 54. The brake discs 56 are keyed and non-rotatable on the shank 54 such as by the shank 54 having opposed flat sections 59 with the openings 58 having corresponding substantially flat portions 60 in engagement with the flats 59. As shown, the brake discs alternate with a brake disc 56 being positioned between two adjacent brake discs 55 with the exception of the two end brake discs and are axially movable on the brake holder shaft 47. In the illustrated structure, as best seen in FIG. 4, a shoulder 61 is provided on the brake holder shaft 47 and is in engagement with one of the brake discs and limits the axial movement of the brake discs on the shank 54. The interior surface of the hub 18 is provided with a plurality of circumferentially spaced key ways or slots 63 as for example, three in number, which extend axially of the hub 18. The brake discs 56 each have radially extending ears 64 on the peripheries thereof, corresponding in number to the number of slots 63, with each of the ears 64 receivable within a respective slot 63 whereby the brake discs 55 rotate on the shank 54 in response to rotation of the hub 18.

The brake holder shaft 47 is restrained from rotation on the axle 15, and as shown, a torque arm 65 is mounted on a free end of the brake holder shaft 47, such as by the arm 65 having an opening 67 therethrough receiving a portion of the free end therein. The arm 65 is keyed on the free end of the brake holder shaft and the free end 69 of the arm 65 is secured to the arm 4 and prevents rotation of the brake holder shaft 47 relative to the axle 15. The brake actuating shaft 48 is rotatably mounted on the axle 15, such as by a bearing race cone 70, threadably engaged with the axle 15 and having a ball bearing 71 in engagement therewith and a bearing race 72 in the brake actuating shaft 48. The brake actuating shaft 48 has a shank 73 extending into the hub 18 and terminating just short of the end of the shank 54. Means cooperate with the brake actuating shaft 48 to urge axial movement of the brake discs 55 and 56 whereby adjacent braking surfaces are urged into frictional engagement. A brake pusher or force applying device is mounted on the shank 73 and includes a female threaded member 74 having threads 75 on the interior surface thereof in engagement with threads 76 on the shank 73 which forms a male threaded member. A pusher member 78 has an axial aperture 79 therethrough receiving a portion of the shank 73 therein with the shank 73 being rotatable within the bore 79. The bore 79 receives an end of the shank 54 therein and is keyed thereon by having flats 80 engageable with the flats 59 whereby the pusher member 78 is non-rotatable on the shank 54. An end surface 81 is positioned adjacent to the end brake disc and is selectively engageable therewith as later described. The female member 74 and the pusher member 78 have adjacent surfaces 83 and 84 that are selectively engageable, as later described, and preferably having interengaging teeth 85 and 86 respectively. A return spring 87 is rotatably mounted in a groove 88 in the pusher member 78 and has an ear 89 positioned in a slot 90 in the female member 74. In the illustrated form, the threads 75 and 76 are lefthand whereby rotation in a direction reverse to forward rotation of the multi-state sprocket 17 moves the female member 74 axially to the right as illustrated in FIG. 4 thereby urging the pusher member 78 into engagement with the brake discs applying force thereto whereby frictional engagement between contacting surfaces of the brake discs 55 and 56 effects braking of the hub 18 and the rear bicycle wheel.

Means are provided for operatively connecting the drive assembly 32 to the brake actuating shaft 48 whereby reverse rotation of same is effected by reverse rotation of the drive assembly. Any suitable means of operative connection can be used and in the illustrated structure a sprocket 92 is suitably secured to a portion of the brake actuating shaft 48 which is adjacent the end 20' opposite the end 20 of the hub 18 which has the multi-stage sprocket assembly 17 thereon. A sprocket 93 is secured to the shaft 35 on the opposite side of the mounting member 2 that the sprocket assembly 32 is mounted on with the sprocket 93 being rotatable with the shaft 35 and pedal cranks 37. A chain guard 95 is secured to the sprocket 93 for safety reasons. A chain 94 operatively connects the sprocket 92 with the sprocket 93 so that forward and reverse rotation of the sprocket 93 effects forward and reverse rotation of the sprocket 92 respectively. It is to be noted that forward rotation of the sprocket 92 moves the female member 74 axially to the left as seen in FIG. 4, whereby the brake discs 55 and 56 are in non-braking relation having no axial force applied thereto so that the hub 18 can be driven in forward rotation as described above. Reverse rotation of the pedal cranks 37 disengages the clutch 21 and engages the brake discs 55 and 56 by application of axially directed force thereon for braking of the hub 18 as described above. It is to be noted that with the coaster brake assembly as shown, a minimum amount of reverse rotation of the sprocket 92 is required to effect braking and by having the sprocket 93 larger in diameter than the sprocket 92 less reverse rotation or angular displacement of the pedal crank 37 than the sprocket 92 is required to effect braking of the hub 8. Preferably, reverse rotation of the sprocket 93 is less than 45° of rotation or angular displacement.

It is to be noted that the amount of reverse rotation of the sprocket 93 necessary to actuate the brake is independent of which driving sprocket the chain 40 is in engagement with, whereby the degree of reverse rotation required for braking is constant and independent of the speed ratio selected. Further, the drive chain 40 is used solely for driving the rear wheel and the brake chain 94 is used solely for actuating the coaster brake. The chains 40 and 93 are on opposite sides of the rear wheel and bicycle frame 1 and prevent entanglement of the chains during operation of the bicycle making same safer to use.

It is to be understood that while I have illustrated and described certain forms of my invention, it is not to be limited to the specific form or arrangement of parts herein described and shown.

What I claim and desire to secure by Letters Patent is:

1. A drive and braking apparatus for multi-speed bicycles comprising:
   a. an axle;
   b. a hub rotatably mounted on said axle, said hub having first and second ends;
   c. a multi-stage sprocket assembly mounted on said hub adjacent said first end and having a clutch operatively connecting same and said hub for selectively driving said hub in one direction, said clutch being mounted on said hub on the exterior thereof and having said multi-stage sprocket thereon;
   d. brake means between the axle and said hub, said brake means including a plurality of brake members;
   e. actuator means mounted on said axle and operatively associated with said brake means, said actuator means having a portion rotatable in a direction opposite to said one direction;
   f. a pedal crank and drive sprocket;
   g. a drive chain operably connecting said drive sprocket and multi-stage sprocket assembly;
   h. means operably connecting said actuator means rotatable portion to said pedal crank whereby rotation of said pedal crank rotates said rotatable portion in said opposite direction and actuates said brake means;
   i. a bicycle frame having a rear portion with said axle secured thereto, said pedal crank and drive sprocket being rotatably mounted on said frame forwardly of said axle, said frame having opposite sides with said drive sprocket being positioned on one of said sides and said means being positioned on the other side;
   j. a first brake sprocket mounted on said pedal crank and rotatable therewith, said first brake sprocket being on the other side of said bicycle frame;
   k. a second brake sprocket being mounted on said actuator means rotatable portion said second end;
   l. A brake chain extending between and operably connected to said first and second brake sprockets;
   m. an arm operatively connected to said brake means and positioned on the exterior of said hub adjacent said one end and having one end secured to a portion of said bicycle frame, said arm preventing relative rotation between said axle and certain of said brake members.

2. The apparatus as set forth in claim 1 wherein said brake means includes:
   a. a brake holder shaft mounted on said axle and having an end extending from said hub first end and having said arm secured to said brake holder shaft end preventing rotation of same on said axle;
   b. said brake members include a plurality of first brake discs rotatably mounted on said brake holder shaft and having portions engaging said hub and being rotatable therewith;
   c. said brake members include a plurality of second brake discs mounted on said brake holder shaft and retained from rotation thereon, certain of said second brake discs being positioned between respective first brake discs for selective frictional engagement between adjacent faces of said first and second brake discs; and
   d. said actuator means applying axially directed force to said first and second brake discs when said pedal crank is rotated in said opposite direction, said force inducing frictional engagement between said first and second brake discs faces for braking said hub.

3. The apparatus as set forth in claim 2 wherein said actuator means includes:
   a. said actuator means rotatable portion being a brake actuating shaft rotatably mounted on said axle and having a portion extending into said hub toward said hub first end;
   b. a first member mounted on said brake actuating shaft;
   c. a pusher member mounted on said brake holder shaft and axially movable thereon, said pusher member being positioned between said first member and said brake members and being retained from rotation on said brake holder shaft; and
   d. cooperative means on said brake actuating shaft and said first member to convert rotary movement of one to axial movement of the other whereby axially directed force is selectively applied to said brake members by said pusher member by the opposite direction rotation of said brake actuating shaft.

4. The apparatus as set forth in claim 3 wherein said cooperative means includes:
   a. threads on said brake actuating shaft portion and forming a male theaded end; and
   b. threads on said first member forming a female threaded end in threaded engagement with said male threaded end.

5. The apparatus as set forth in claim 1 wherein:
   a. said clutch being of a ratchet type requiring a minimum of rotation in said one direction of said multi-stage sprocket relative to said hub for actuation of said clutch and driving said hub; and
   b. said brake means being actuted by a minimum of rotation in said opposite direction of said pedal crank with the opposite direction rotation required being independent of the speed ratio of the drive sprocket and multi-stage sprocket.

6. A drive and braking apparatus for multi-speed bicycles comprising:
   a. an axle;
   b. a hub rotatably mounted on said axle, said hub having first and second ends;
   c. a multi-stage sprocket assembly mounted on said hub adjacent said first end and having a clutch operatively connecting same and said hub for selectively driving said hub in one direction, said clutch being mounted on said hub on the exterior thereof and having said multi-stage sprocket thereon;
   d. brake means between the axle and said hub, said brake means including a plurality of brake members;
   e. actuator means mounted on said axle and operatively associated with said brake means, said actuator means having a portion rotatable in a direction opposite to said one direction;
   f. a pedal crank and drive sprocket;
   g. a drive chain operably connecting said drive sprocket and multi-stage sprocket assembly;
   h. means operably connecting said actuator means rotatable portion to said pedal crank whereby rotation of said pedal crank rotates said rotatable portion in said opposite direction and actuates said brake means;
   i. a first brake sprocket mounted on said pedal crank and rotatable therewith;
   j. a second brake sprocket being mounted on said actuator means rotatable portion adjacent said second end;
   k. a brake chain extending and operably connected to said first and second brake sprockets;
   l. an arm operatively connected to said brake means and positioned on the exterior of said hub adjacent said one end and having one end secured to a portion of said bicycle frame, said arm preventing relative rotation between said axle and certain of said brake members.

* * * * *